May 22, 1928.
J. C. STIMSON
REFLECTING DEVICE
Filed July 9, 1923
1,671,086
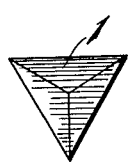
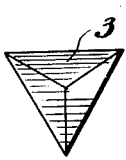
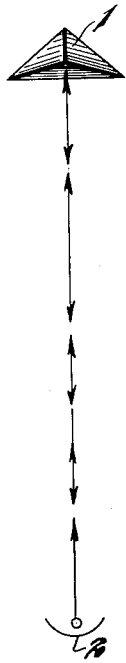
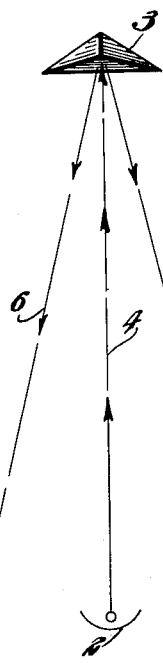
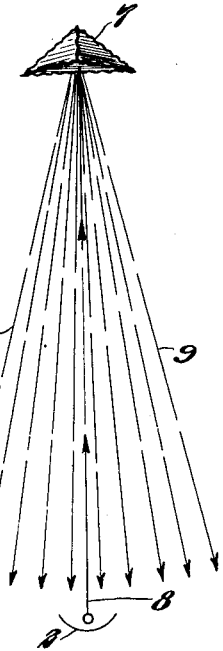
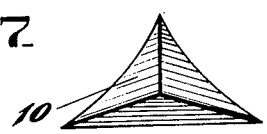
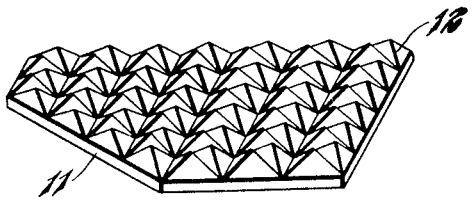
Inventor:
Jonathan C. Stimson.
By John N. Bruninga
Atty.

Patented May 22, 1928.

1,671,086

UNITED STATES PATENT OFFICE.

JONATHAN C. STIMSON, OF ST. LOUIS, MISSOURI.

REFLECTING DEVICE.

Application filed July 9, 1923. Serial No. 650,402.

This invention relates to reflecting devices, and more particularly to devices employing the principles and features of triple reflectors.

If three reflecting surfaces are arranged to intersect at a common point with the reflecting surfaces at right angles to each other, so as to form in effect the corner of a cube, then a beam incident on such a device is reflected from surface to surface about the axis or center of the device and back along the incident beam; it may, therefore, be called a central triple reflector. Such a reflector has the property of reflecting incident beams back to their source irrespective (within limits) of the angle of incidence of such a beam with respect to the axis. Where the reflector is a prism causing refraction of the incident beam, the limiting angle of incidence (with respect to the axis) can be increased while the loss of reflected rays is decreased for any given angle of incidence.

In the accompanying drawing

Figure 1 is a face view of a central triple reflector;

Figure 2 is a view showing the reflector of Figure 1 in perspective and showing the paths of incident and reflected beams;

Figures 3 and 4 are views similar to Figures 1 and 2 respectively, but showing a central triple reflector, the angles of one or more surfaces of which are so arranged as to deviate from right angle relation;

Figures 5 and 6 are views similar to Figures 1 and 2 respectively, but in which one or more surfaces of the central triple reflector are not optically plane;

Figure 7 is a perspective view similar to Figure 2 but showing a central triple reflector, one or more surfaces of which are arranged to vary progressively from right angle relation; and Figure 8 is a perspective view showing a prismatic plate embodying this invention.

Referring to the accompanying drawing, Figures 1 and 2 show a central triple reflector in the form of a prism 1 of glass or other transparent material, the reflecting surfaces of which are in proper right angular relation and are highly polished to be optically plane so as to form an optically true, congruent trihedral angle. A beam from a source of light 2, impinging on such a reflector and having a cross-section equal to the reflector aperture, will be reflected directly back to its source, the reflected beam being in fact superimposed upon the impinging beam; this is true, irrespective within limits, of the angle of incidence of the impinging beam. It will be readily seen that such a reflector has limited practical application for the reason that the reflected beam is only observable on a line connecting the source of light with the reflector.

If the mutual relation of the surfaces of the reflector is disturbed, even slightly, from that of an optically true, congruent trihedral angle, as shown in Figs. 3 and 4, then the reflected beam 4 impinging on reflector 3 is not returned to the source and is not observable thereat, but the incident beam is reflected in the form of two or more pencils of light having the same intensity as the impinging beam, the sum of the cross sections of the reflected pencils being equal to the cross section of the impinging beam. These reflected pencils deviate angularly in their reflected course from the direction of the impinging beam as shown (exaggerated) in Figure 4, the extent of the angular deviation, the number of pencils formed, and the relative positioning of the reflected pencils with respect to the incident beam depending upon, first whether one or all of the surfaces vary from the ninety degree (90°) angular relation, second the extent of the angular deviation from ninety degrees (90°), and third the orientation of the surfaces of the reflector 3 with respect to the original beam. If only one surface deviates angularly as shown in Figure 4, then a beam 4 impinging upon such a reflector 3 will be reflected in the form of two pencils 5 and 6, while if more than one surface deviates, the reflection will be in the form of six pencils. The above is true irrespective, within limits, of the angle of incidence of the impinging beam wth respect to the axis of the reflector.

While such a reflector as shown in Figures 3 and 4 causes an incident beam to be reflected so as to be observable along a line other than that connecting the source with the reflector, it still has limited application for the reason that the reflection is in the form of pencils which are only observable when the observer is in the direct path of these pencils. Thus if the reflector were constructed so that one of the reflected pencils would be observable at a certain distance from the reflector and at a certain distance laterally from the source of light, it would be out of visible range for any other position of the observer with respect to the reflector or the source, except along the path of the reflected pencil.

In order to permit the application of a reflector for practical purposes it is necessary that the reflection be observable within a chosen field or plane transverse of the axis of the reflector, so as to be visible to an observer located at a substantial distance outside of a line connecting the reflector with the light source; as for instance in the case of a driver of an automobile, whose eye is above or generally laterally of the automobile headlight which directs the light on such a reflector.

One of the objects of this invention, therefore, is to provide a reflector of the general character referred to whose surfaces are so formed as to reflect the impinging light in the form of a definite beam which is visible to the observer located a substantial distance outside of a line connecting the reflector with the source of light.

Another object of this invention is to provide a reflector of the character described whose surfaces are formed so as to reflect the impinging light in the form of a definite spreading beam of substantially uniform intensity.

Another object is to provide a reflector of the character described in which the reflected light is not only spread but distributed throughout the field of spread.

Another object is to provide multi-unit reflectors of the character described in which the units are so formed and arranged as to cause the spreading fields of reflected light to merge into a definite spreading beam.

Another object is to provide a process or method of making a reflector of the character described.

Further objects will appear from the detail description.

Generally stated in accordance with this invention, the reflector is of the character in which a series of reflecting surfaces are arranged relatively at approximate right angles and in a circuit around the reflector axis so that light impinging thereon from a distant source will be successively reflected by the surfaces about the axis and back in the general direction of the light source. One or more of the reflecting surfaces deviates as a whole slightly but sufficiently from optically true right angular relation in order to cause a definite spread of the reflected light. Means is provided for distributing the reflected light throughout the field of spread in order to direct a definite spreading beam of substantially uniform intensity back towards and visible to an observer located a substantial distance outside of a line connecting the reflector with the light source. This is accomplished by means hereinafter more fully described.

In accordance with one embodiment of this invention the surfaces of a reflector are distorted or deviated from those of an optically true, congruent trihedral angle in such a manner as to secure spread reflection. This is preferably accomplished by distorting portions of one or more of the surfaces at varying angles to the axis, or by otherwise varying the same, so that one or more surfaces of the central triple reflector are not optically plane.

In accordance with an embodiment of this invention as shown in Figures 5 and 6, a prismatic reflector 7 is shown as constructed of pressed glass, which is cheaply and easily made by the ordinary process of pressed glass manufacture. The right angular relationship of the reflecting surfaces is generally maintained, but the surfaces are not optically accurate in the accepted sense of the term, but are purposely only an approximation thereof; it is essential that the surfaces be so formed in order to carry out the purpose of this invention. The mold or matrix of the reflector is, therefore, constructed with the angles approximately accurate, that is, within about one degree of ninety degrees (90°), but not within a second or less as is required in an optical device if a defined undistorted image is to be secured. The surfaces of the mold are made as plane as is conveniently possible and are given a degree of polish. If not polished too highly there are minute irregularities in the surfaces that result in a symmetrical spreading of the light as it is successively reflected upon the three surfaces; the irregularities forming a large number of minute reflecting surfaces of different angles, these surfaces varying sufficiently from a true plane to cooperate together in the multiple reflection of the three surfaces so as to spread the light to a degree, but not varying sufficiently from ninety degrees (90°) to scatter the light out of a defined beam or field.

As shown in Figures 5 and 6 in which the irregularities have been exaggerated, the impinging beam 8 is reflected to form a spreading beam 9 of uniform intensity.

In the construction of a pressed glass reflecting prism as shown in Figures 5 and 6, the latter is a duplicate in reverse of the mold and in whatever manner the mold is formed the reflector will correspond. In practice a reflector suitable for most purposes is secured by giving the mold the highest possible polish, the grain of the metal and the effect of shrinkage of the glass in the pressing operation providing a surface, the reflection from which has about the proper amount of spread. As will, however, be obvious the spread of the beam and the uniformity thereof can be controlled by the degree of polish. In accordance with this invention, therefore, the reflector is formed without reference to optical accuracy, in that the angular relation of one or more of the surfaces may deviate from those of an optically true, congruent trihedral angle, but the inaccuracy of the surfaces depending as it does upon the degree of polish and shrinkage, will compensate for the inaccuracy of the angular relations of the surfaces, so that the portions of the surfaces are so formed as to compensate for the angular deviation of the surfaces. Accordingly while the tendency of the deviation of one or more of the resulting reflecting surfaces from optically true right angular relation is to divide the reflected light into two or more separated spreading pencils, as illustrated in Fig. 4, the deviation of the surfaces from a true optical plane operates to distribute the reflected light throughout the field of spread otherwise encompassed by the diverging separated pencils.

A reflector made as described above results in a structure with three total internal reflecting surfaces which triply reflect light impinging upon the front surface of the reflector. Because of the minute variations distributed over the entire series of surfaces, which deviate in various degrees from optical perfection, but which do not deviate sufficiently from an optically true, congruent trihedral angle, to cause complete dissipation of the light, the impinging beam is triply reflected in the form of a spreading beam back towards the light, the spreading being such that the reflected light fills a conical field with the reflector as the apex and with the source of light lying in the axis of the cone. It will be particularly noted that the reflected beam is substantially uniform and is not in the form of a series of pencils of reflected light with intervening dark spaces.

Where the greatest feasible distance visibility is required and the observer is located at a point fairly close to the line connecting the reflector with the source of light, then it is necessary to make the mold for the pressed glass reflector carefully, with a sufficiently high degree of accuracy and polish upon the surfaces so that the reflected beam will be confined to a cone with a small angular spread. Where it is desired to have a large conical field of reflected light and distance visibility is a secondary consideration, then the mold is purposely made without a high polish so as to dull the polish of the reflecting surfaces in order to obtain a beam of greater spread. Within limits the variations in the reflector may be made so as to fill the requirements necessary for a wide variety of uses and applications.

In the case of hollow type reflectors of the character described formed by silvered mirrors set at approximately right angles, the surfaces of the silvered glass or other reflecting surfaces can be slightly broken up or left partially unpolished so as to vary from a true plane sufficiently to secure a spreading beam and uniform distribution of the light. This can readily be secured in the case of silvered surfaces of glass by using ordinary window glass for the reflectors, or as a cover glass for the front of the reflector. Where the reflector is made of pressed glass (as particularly shown in Fig. 8 and hereinafter more fully described) so as to form a transparent solid or prismatic reflector, the front face is in that case conformed to a surface of the mold so as to form a face which deviates from a plane. In these embodiments, therefore, employing silvered window glass for the reflectors, a cover of window glass, or prismatic glass plates formed to shape as described, there is placed in front of the reflecting surfaces, a heterogeneous or irregular refracting medium which will operate to secure a definite spreading beam and uniform distribution of the light.

In the embodiment shown in Figure 7 one or more of the reflecting surfaces of the prism 10 are made either concave or convex, the concavity being such and made so progressively from the axis outwardly as to secure the desired spread of the beam and the desired uniformity of light distribution. In this case the surfaces may be made smooth since the spread is secured by the progressive variation of a curved surface from that of a plane surface.

In Figure 8 is shown a prismatic plate 11 provided with a series of reflectors 12 of the character heretofore described on the back thereof and arranged in contiguous relation to form together a reflector. This prismatic plate may be formed of pressed glass in a manner heretofore described so as to secure the advantageous results heretofore referred to. By grouping these reflectors in contiguous relation over the reflecting face, varying orientations of the unit reflectors with respect to any given beam is secured. In view of the fact that the reflector units are arranged in contiguous relation, with each unit constructed as heretofore described, the spreading fields of light from the several units merge into a definite spreading beam. Accordingly the angular range of the device is much greater than where the simple triple reflector is used. It will also be noted that this plate may be formed as described in application Serial Number 632,415, filed April 16, 1923, in which the reflectors have hexagonal apertures so as to form a substantially continuous active reflecting area or face which will appear uniformly illuminated. As enumerated in said application, this invention is applicable to signs illuminated from an extraneous source of light, specific uses of such signs being road signs, danger signals at railroad grade crossings and at curves, and tail lights for automobiles, all of which secure their illumination from extraneous sources such as automobile or other head lights. This invention is particularly applicable for such uses, for here, for instance, a road sign or signal is illuminated by an automobile headlight, the spread of the reflected beam will be sufficient so as to be observable by the driver, whose eye is not in the direct line between the reflector and the head light, but above or laterally of such line.

It is obvious that various changes may be made in details without departing from the spirit of this invention; it is, therefore, to be understood that this invention is not to be limited to the specific details shown and described.

Having thus described the invention, what is claimed is:

1. A reflecting device of the character described, comprising, a series of reflecting surfaces arranged relatively at approximate right angles and in a circuit around the reflector axis so that light impinging thereon from a distant source will be successively reflected by said surfaces about said axis and back in the general direction of the light source, one or more of the reflecting surfaces deviating as a whole slightly from optically true right angular relation in order to cause a definite spread of the reflected light, and means for distributing the reflected light throughout the field of spread in order to direct a definite spreading beam of substantially uniform intensity back toward and visible to an observer located a substantial distance outside of a line connecting the reflector with the light source.

2. A reflecting device of the character described, comprising, a series of reflecting surfaces arranged relatively at approximate right angles and in a circuit around the reflector axis so that light impinging thereon from a distant source will be successively reflected by said surfaces about said axis and back in the general direction of the light source, one or more of the reflecting surfaces deviating as a whole slightly from optically true right angular relation in order to cause a definite spread of the reflected light, one or more of said reflecting surfaces deviating sufficiently from a true optical plane as to distribute the reflected light throughout the field of spread in order to direct a definite spreading beam of substantially uniform intensity back toward and visible to an observer located a substantial distance outside of a line connecting the reflector with the light source.

3. A reflecting device of the character described, comprising, a series of reflecting surfaces arranged relatively at approximate right angles and in a circuit around the reflector axis so that light impinging thereon from a distant source will be successively reflected by said surfaces about said axis and back in the general direction of the light source, one or more of the reflecting surfaces deviating as a whole slightly from optically true right angular relation in order to cause a definite spread of the reflected light, and means in front of said reflecting surfaces adapted to distribute the reflected light throughout the field of spread in order to direct a definite spreading beam of substantially uniform intensity back toward and visible to an observer located a substantial distance outside of a line connecting the reflector with the light source.

4. A reflecting device of the character described, comprising, a series of reflecting surfaces arranged relatively at approximate right angles and in a circuit around the reflector axis so that light impinging thereon from a distant source will be successively reflected by said surfaces about said axis and back in the general direction of the light source, one or more of the reflecting surfaces deviating as a whole slightly from optically true right angular relation in order to cause a definite spread of the reflected light, said reflector having a front transparent face which deviates sufficiently from a true optical plane as to distribute the reflected light throughout the field of spread in order to direct a definite spreading beam of substantially uniform intensity back toward and visible to an observer located a substantial distance outside of a line connecting the reflector with the light source.

5. A reflecting device of the character described, comprising, a series of reflecting surfaces arranged relatively at approximate right angles and in a circuit around the reflector axis so that light impinging thereon from a distant source will be successively reflected by said surfaces about said axis and back in the general direction of the light source, one or more of the reflecting surfaces deviating as a whole slightly from optically true right angular relation in order to cause a definite spread of the reflected light, said reflector having a front transparent face, and said face and one or more of said reflecting surfaces deviating sufficiently from a true optical plane as to distribute the reflected light throughout the field of spread in order to direct a definite spreading beam of substantially uniform intensity back toward and visible to an observer located a substantial distance outside of a line connecting the reflector with the light source.

6. A reflecting device of the character described, having a series of reflecting units arranged in contiguous relation, each of said units comprising a series of reflecting surfaces arranged relatively at approximate right angles and in a circuit around the axis thereof so that light impinging thereon from a distant source will be successively reflected by said surfaces about said axis and back in the general direction of the light source, one or more of the reflecting surfaces of each of said units deviating as a whole slightly from optically true right angular relation in order to cause a definite spread of the reflected light from each unit, and means for distributing the reflected light from each unit throughout its field of spread, adapted to cause spreading fields of light from the several units to merge into a definite spreading beam.

7. A reflecting device of the character described, having a series of reflecting units arranged in contiguous relation, each of said units comprising a series of reflecting surfaces arranged relatively at approximate right angles and in a circuit around the axis thereof so that light impinging thereon from a distant source will be successively reflected by said surfaces about said axis and back in the general direction of the light source, one or more of the reflecting surfaces of each of said units deviating as a whole slightly from optically true right angular relation in order to cause a definite spread of the reflected light from each unit, one or more of the reflecting surfaces of each unit deviating sufficiently from a true optical plane as to distribute the reflected light from each unit throughout its field of spread, adapted to cause spreading fields of light from the several units to merge into a definite spreading beam.

8. A reflecting device of the character described, having a series of reflecting units arranged in contiguous relation, each of said units comprising a series of reflecting surfaces arranged relatively at approximate right angles and in a circuit around the axis thereof so that light impinging thereon from a distant source will be successively reflected by said surfaces about said axis and back in the general direction of the light source, one or more of the reflecting surfaces of each of said units deviating as a whole slightly from optically true right angular relation in order to cause a definite spread of the reflected light from each unit, and means in front of said reflecting surfaces adapted to distribute the reflected light from each unit throughout its field of spread, adapted to cause spreading fields of light from the several units to merge into a definite spreading beam.

9. A reflecting device of the character described, comprising, a transparent prismatic plate having a series of reflecting units arranged in contiguous relation, each of said units having a series of totally reflecting surfaces arranged relatively at approximate right angles and in a circuit around the axis thereof so that light impinging thereon from a distant source will be successively reflected by said surfaces about said axis and back in the general direction of the light source, one or more of the reflecting surfaces of each of said units deviating as a whole slightly from optically true right angular relation in order to cause a definite spread of the reflected light from each unit, one or more of the reflecting surfaces of each unit deviating sufficiently from a true optical plane as to distribute the reflected light from each unit throughout its field of spread.

10. A reflecting device of the character described, comprising, a transparent prismatic plate having a series of reflecting units arranged in contiguous relation, each of said units having a series of totally reflecting surfaces arranged relatively at approximate right angles and in a circuit around the axis thereof so that light impinging thereon from a distant source will be successively reflected by said surfaces about said axis and back in the general direction of the light source, one or more of the reflecting surfaces of each of said units deviating as a whole slightly from optically true right angular relation in order to cause a definite spread of the reflected light from each unit, the transparent material between the reflector front and said reflecting surfaces being disposed so as to distribute the reflected light from each unit throughout its field of spread.

11. In the art of making reflectors whose surfaces are arranged relatively at approximate right angles and in a circuit around the reflector axis, the process comprising, placing one or more of the reflecting surfaces in slight deviation from optically true right angular relation as to cause a definite spread of light reflected therefrom and forming one or more of the reflecting surfaces in sufficient deviation from a true optical plane as to distribute the reflected light throughout the field of spread.

12. In the art of making reflectors whose surfaces are arranged relatively at approximate right angles and in a circuit around the reflector axis, the process comprising, placing one or more of the reflector surface forming faces of a matrix in slight deviation from optically true right angular relation as to cause a definite spread of light reflected from the reflector surfaces conformed thereto and forming one or more of the matrix faces in sufficient deviation from a true optical plane as to distribute the light reflected from the reflector surfaces conformed thereto throughout the field of spread.

13. In the art of making pressed prismatic reflectors whose surfaces are arranged relatively at approximate right angles and in a circuit around the reflector axis, the process comprising, forming the matrix faces in such angular relation as to deviate one or more of the reflecting surfaces of the impression slightly from optically true right angular relation as to cause a definite spread of the light reflected therefrom.

14. In the art of making pressed prismatic reflectors whose surfaces are arranged relatively at approximate right angles and in a circuit around the reflector axis, the process comprising, forming the matrix faces in such angular relation as to deviate one or more of the reflecting surfaces of the impression slightly from optically true right angular relation as to cause a definite spread of the light reflected therefrom and facially forming one or more of the matrix faces so as to deviate the corresponding reflecting surface of the impression sufficiently from a true optical plane as to distribute the reflected light throughout the field of spread.

In testimony whereof I affix my signature this 7th day of July, 1923.

JONATHAN C. STIMSON.